United States Patent [19]
Mitchell

[11] 3,903,028
[45] Sept. 2, 1975

[54] SMOKE RETARDANT COMPOSITIONS
[75] Inventor: Lawrence C. Mitchell, Mt. Vernon, Ind.
[73] Assignee: Ethyl Corporation, Richmond, Va.
[22] Filed: June 7, 1974
[21] Appl. No.: 477,437
   Related U.S. Application Data
[63] Continuation-in-part of Ser. No. 355,652, April 30, 1973, abandoned, which is a continuation-in-part of Ser. No. 196,801, Nov. 8, 1971, Pat. No. 3,845,001.

[52] U.S. Cl....260/23 XA; 260/31.8 R; 260/45.75 C; 260/45.75 R; 260/45.75 P; 260/45.75 G; 260/45.75 M; 260/45.75 N
[51] Int. Cl. ............................................ C08f 45/56
[58] Field of Search ............... 260/45.75 C, 45.75 R, 260/45.75 P, 31.8 R, 23 XA

[56]         References Cited
       UNITED STATES PATENTS
2,286,744   6/1942   Leatherman ..................... 117/137

Primary Examiner—V. P. Hoke
Attorney, Agent, or Firm—Donald L. Johnson; Robert A. Linn

[57]         ABSTRACT
Iron oxide admixed with copper or molybdenum compounds, impart smoke retardant properties to combustible materials such as plastics. Thus for example, polyvinyl chloride does not emit as much smoke during combustion when it is compounded with $Fe_2O_3$, $MoO_3$, and $Cu_2O$.

6 Claims, No Drawings

SMOKE RETARDANT COMPOSITIONS

This application is a continuation-in-part of application, Ser. No. 355,652, filed Apr. 30, 1973, and now abandoned, which in turn is a continuation-in-part of application Ser. No. 196,801, filed Nov. 8, 1971, and now U.S. Pat. No. 3,845,001.

BACKGROUND OF THE INVENTION

This invention provides additives for plastics that will decrease their tendency to smoke when burned. It is believed that such use of the additives provided has not been described in the art.

Netherlands patent No. 69/18,861 is reported to teach that preparations of antimony trioxide and an inorganic salt impart flame and smoke reducing properties to resin compositions.

Iron oxide and other oxides have been added to polyvinyl halide for pigment purposes; Woernle, SPE Journal, pages 535–544 (May 1960); DeCaste and Hansen, Ibid. 18 No. 4 pp 431–439 (April 1962).

SUMMARY OF THE INVENTION

In one aspect, this invention provides a polyvinyl halide admixed with a smoke retardant amount of iron oxide. In another aspect, this invention provides polyvinyl halide compounded with a mixture of iron oxide with copper oxide and/or molybdenum oxide.

This invention also provides a method for imparting smoke retardancy to plastics which method comprises blending resins with compounds such as set forth above. Similarly, this invention provides blends for incorporation in resins. Such blends may be mixtures of the compounds themselves or the compound mixtures can be combined with the resin or other materials such as a solvent, or a plasticizer or other ingredient utilized to form a resin composition.

Smokes can be a hazard during a fire. Dense smoke hampers fire fighting measures and can obscure escape routes for those within a burning enclosure. Therefore, building materials which emit lesser amounts of smoke during combustion can be a safety feature. This invention serves to provide compositions with lessened tendencies to smoke and accordingly, one utility of this invention pertains to improvement in materials utilized in construction. However, formulations of this invention can be used wherever it is desirable to use materials which can lessen the amount of smoke produced upon combustion.

DESCRIPTION OF PREFERRED EMBODIMENTS

In the practice of this invention, a smoke retardant amount of additive is used to treat a combustible material such as a plastic resin.

Polyvinyl halide resins can be used in this invention. Applicable polyvinyl halides include homopolymers, copolymers and polymer mixtures. Illustrative and nonlimiting examples of applicable polyvinyl halide resins are:

1. Homopolymers — Polyvinyl chloride, polyvinyl bromide, polyvinyl fluoride, polyvinylidene chloride, polydichlorostyrene and the like, 2. Copolymers — Vinylchloride-vinyl acetate, vinylchloride-vinyl alcohol, vinylchloride-vinylidene chloride, vinylchloride-diethyl maleate, vinyl chloride esters of unsaturated alcohols and unsaturated acids and the like, and 3. Mixtures — Polyvinyl chloride and polydichlorostyrene, polyvinyl chloride and vinyl acetate-vinyl chloride copolymer, polyvinyl chloride, polyvinylidene chloride, and a copolymer of vinyl chloride-diethylmaleate and the like.

The resins can be treated with the smoke retardant additive or additives in any convenient manner. In some instances, smoke retardancy may be achieved by treating one or more surfaces of a plastic article with the additive or additives such that a treated surface is overlayed or padded with the additive composition. However, in general, it is preferred to blend an additive within a resin composition. The blending can be accomplished by any appropriate blending or mixing technique available in the art.

In the practice of this invention, a smoke retardant amount of provided additive is used to treat a combustible substance. In general, there is usually a relationship between the smoke retardancy achievable and the amount of additive employed. Therefore at least within some concentration range, usually a greater amount of additive will provide a greater amount of smoke retardancy, all other factors remaining the same. In some instances, there is a practical upper limit on the amount of additive used. This upper limit is based on secondary factors such as cost, ease of blending, or interference with some other desirable property of the substrate, for example. In many instances, from about 0.5 to about 40 parts by weight are used for each 100 parts by weight of substrate resin. Preferably from about 1 to about 30 parts for 100 parts resin, more preferably 1 to about 15 parts per 100 parts resin are employed. However, greater or lesser amounts can be used if desired.

Ferric oxide, $Fe_2O_3$, can be used in this invention. Its use suggests utility of other iron oxides; viz. FeO and $Fe_3O_4$.

For this invention a smoke retardant amount of an additive mixture is added to a polyvinyl halide as described above. For binary mixtures such as iron oxide-copper compound or iron oxide-molybdenum compound there can be from 1 to 99 parts by weight of the first substance to 99 to 1 parts by weight of the second. For example, within this range an exemplary additive mixture is cuprous oxide-ferric oxide (60:40). The numbers in parenthesis refer to parts by weight. Thus, this mixture contains 60 parts of $Cu_2O$ and 40 parts of $Fe_2O_3$. In this ternary mixture of iron oxide with a copper and a molybdenum compound each component can have from 1 to 98 parts by weight. Thus, the mixtures can be

A, B, C, (1:1:98)
A, C, B, (1:98:1)
A, B, C, (98:1:1)

where A signifies iron oxide, B a copper compound, and C a molybdenum compound. An exemplary ternary mixture of this invention is ferric oxide-molybdenum trioxide-cuprous oxide (20:40:40), wherein the numbers in the parenthesis refer to parts by weight as referred to above.

Cuprous or cupric oxide can be used. Cuprous oxide has been shown to give a better response in some testing, hence it is preferred. The applicability of such oxides suggests the use of other copper compounds such as the corresponding sulfides, Cu(I) and Cu(II) chelates such as the acetonylacetates, copper salts of carboxylic acids such as the acetates and butyrates, hydrates of all these, and organocopper compounds such as the copper carbonyls.

Molybdenum trioxide, $MoO_3$, can be used in this invention. Also it has been found that molybdenum carbonyl and ammonium paramolybdate reduce smoke. These may be admixed with the copper oxides, for example.

Applicability of such compounds suggests other molybdenum compounds can be blended; for example, oxides and sulfides viz. $MoO_2$, $Mo_2O_5$, $Mo_2O_3$, $MoS_2$, $MoS_3$, $MoS_4$, $Mo_2S_3$, metal molybdates such as ammonium and copper molybdate, ammonium and sodium paramolybdate, molybdenum salts of carboxylic acids such as acetates and butyrates, chelates such as the acetylacetonates and organomolybdenum compounds. Additional suggested molybdenum compounds are as follows:

Table 1

Dimeric ammonium 5-molybdocobaltate (III)
$(NH_4)_6[Co_2Mo_{10}O_{38}]\cdot XH_2O$ (X=6–10)
Ammonium 6-molybdocobaltate (III)
$(NH_4)_3[CoMo_6O_{24}H_6]\cdot XH_2O$ (X=5–7)
Ammonium 9-molybdonickelate (IV)
$(NH_4)_6[NiMo_9O_{32}]\cdot 6.5\ H_2O$
Ammonium 6-molybdonickelate (II)
$(NH_4)_4[NiMo_6O_{24}H_6]\cdot XH_2O$ (X=4–6)
Ammonium 6-molybdoaluminate (III)
$(NH_4)_3[AlMo_6O_{24}H_6]\cdot XH_2O$ (X=4–7)
Ammonium 6-molybdochromate (III)
$(NH_4)_3[CrMo_6O_{24}H_6]\cdot XH_2O$ (X=4–7)
Ammonium 6-molybdoferrate (III)
$(NH_4)_3[FeMo_6O_{24}H_6]\cdot XH_2O$ (X=5–10)
Molybdenyl acetylacetonate
$(MoO_2)(C_5H_7O_2)_2$

| Example | | | |
|---|---|---|---|
| PVC* Formulas: | Rigid | 20 wt. % DOP** | 33 wt. % DOP |
| Ethyl PVC 500 natural | 100 parts | | |
| Ethyl PVC SM-250 | | 100 parts | 100 parts |
| Dioctyl phthalate (DOP) | | 30 parts | 50 parts |
| Mark WS (Stabilizer) | | 1.0 parts | 1.0 parts |
| Stearic acid (Lubricant) | | 0.5 parts | 0.5 parts |
| Smoke retardant | As indicated | As indicated | As indicated |

*polyvinyl chloride
**di-isooctylphthalate

The smoke retardants were mixed by hand with the appropriate substrate and then mixed by Waring Blendor, Brabender Plastograph, or plastic mill. The homogeneous mixture was molded in a heated press under pressure. The resulting sheet was conditioned in an air circulated oven at 70°C overnight and at 73°F and 50 percent relative humidity overnight.

AMINCO NBS CHAMBER

Specimens 3 inches × 3 inches square and 50 mil thick were cut. The conditioned specimen was placed on aluminum foil cut to size to permit overlapping of the specimen face on all four sides. The wrapped specimen was placed in a holder and burned in the Aminco NBS smoke chamber according to the directions supplied. The amount of smoke was measured by a photomultiplier. Specific optical density was calculated and corrected for soot remaining on the lends at the end of the test. The average of two values is reported.

Rigid PVC, as above, without a smoke suppressant gave a corrected optical density (SODc) of 554. In comparison, $Fe_2O_3$ at a 1 percent concentration had an SODc of 345. (In this test, the smaller the number, the less smoke).

Flexible PVC of the above mixture with 33 weight precent DOP without some suppressant had an SODc of 702, while a i. cuprous oxide-ferric oxide mixture (60:40) had an SODc of 468, and
ii. molybdenum trioxide — cuprous oxide-ferric oxide (40:40:20) had an SODc of 475.

In (i) and (ii) the additive mixture was 4 parts by weight per hundred parts by weight resin. Iron oxide alone in the same concentration had an SODc of 770.

Similar smoke reductions are obtained with flexible PVC with 20 wt. percent DOP. Similar results are obtained using FeO or $Fe_3O_4$.

Similar results are obtained when
  iron oxide — cuprous oxide or
  iron oxide — molybdenum trioxide
mixtures in which the amount of each component is said mixture is from 25 to 75 parts by weight.

Similar results are obtained when $Fe_2O_3$, $MoO_3$, and $Cu_2O$ mixtures are used wherein the amount of each oxide in said mixture is from about 10 to about 80 parts by weight.

Similar results are obtained when the concentration of smoke retardant is 0.5 to 40 parts by weight per hundred parts by weight resin.

Similar results are obtained when the cuprous oxide in the above mixtures is replaced with cupric oxide or these oxides are replaced with other compounds such as the corresponding sulfides, cyanides, Cu(I) and Cu(II) chelates such as the formates, acetates, butyrates, oxalates and the like, hydrides of all these, and organo compounds such as the copper carbonyls. Also, similar results are obtained when the molybdenum trioxide in the above examples is replaced with $MoO_2$, $Mo_2O_3$, or these oxides are replaced with the corresponding sulfides or other molybdenum compounds such as ammonium and copper molybdate, ammonium paramolybdate, copper paramolybdate, molybdenum salts of carcoxylic acids, such as acetates and butyrates, chelates such as the acetylacetonates and the organomolybdenum compounds such as molybdenum hexacarbonyl. Likewise, similar results are obtained when the molybdenum compounds in the mixtures are replaced with those molybdenum compounds listed in Table 1 above.

This invention may be extended to smoke retardant material wherein the molybdenum is in a complex salt of acids such as those found on pages 526–535 of *Fritz Ephraim, Inorganic Chemistry*, 6th Edition by P. C. L. Thorne and E. R. Roberts, Interscience Publishers Inc., New York, N.Y.; 1954. Exemplary salts of this type are ammonium 5-molybdocobaltate (III), 9-molybdonickelate (IV), 6-molybdoaluminate (III) and 6-molybdochromate (III).

When using iron oxide admixed with copper and/or molybdenum compound in a flexible polyvinyl halide, it is preferred that the composition have 5-30 or more parts of plasticizer per 100 parts resin (parts are by weight). The plasticizer can be DOP, or the other materials mentioned in column 6, line 61 - column 7, line 17 of U.S. Pat. No. 3,338,845.

I claim:

1. In a composition consisting essentially of a plasticized polyvinyl halide resin with a stabilizer and lubricant, the improvement comprising addition of from about 0.5 to about 40 parts by weight per hundred parts by weight polyvinyl halide resin of a smoke retardant additive mixutre consisting essentially of iron oxide and molybdenum oxide wherein the amount of each oxide in said mixture is from 25-75 parts by weight.

2. In a composition consisting essentially of a plasticized polyvinyl halide resin with a stabilizer and lubricant, the improvement comprising addition of from about 0.5 to about 40 parts by weight per hundred parts by weight polyvinyl halide resin of a smoke retardant additive mixture consisting essentially of $Fe_2O_3$, $Cu_2O$, and $MoO_3$ wherein the amount of each oxide in said mixture is from about 10 to about 80 parts by weight.

3. The composition of claim 1 wherein said iron oxide is $Fe_2O_3$.

4. A composition of claim 1 wherein said molybdenum oxide is $MoO_3$.

5. A polyvinyl chloride of claim 2 wherein the amount of each oxide in said mixture is from about 20 to about 40 parts by weight.

6. The composition of claim 1 wherein said polyvinyl halide is polyvinyl chloride.

* * * * *